United States Patent [19]

Laffin

[11] 4,008,510
[45] Feb. 22, 1977

[54] FISH SCALER

[76] Inventor: Gerald A. Laffin, Rte. 1, Aniwa, Wis. 54408

[22] Filed: June 23, 1975

[21] Appl. No.: 589,787

[52] U.S. Cl. .................................................. 17/64
[51] Int. Cl.² ...................................... A22C 25/02
[58] Field of Search ............ 17/64, 67, 11.1 R, 18, 17/45, 62; 69/37, 44, 9.5; 15/21 D, 141 A, 236 R; 99/541, 593, 599

[56] References Cited

UNITED STATES PATENTS

| 262,520 | 8/1882 | Warren | 69/37 |
| 427,101 | 5/1890 | Monk | 69/37 |
| 493,454 | 3/1893 | Tobin | 17/64 |
| 1,615,134 | 1/1927 | Price | 17/64 |
| 1,654,428 | 12/1927 | Morgan et al. | 69/37 |
| 1,701,667 | 2/1929 | English et al. | 17/64 |
| 2,029,064 | 1/1936 | Edwards | 17/18 |
| 2,279,685 | 4/1942 | Kaplan | 17/64 |
| 2,702,922 | 3/1955 | Thibodeau | 17/64 |
| 2,795,812 | 6/1957 | Godfrey | 17/64 |

*Primary Examiner*—Robert Peshock
*Assistant Examiner*—James D. Hamilton
*Attorney, Agent, or Firm*—Theodore J. Long; John M. Winter; Harry C. Engstrom

[57] ABSTRACT

A fish scaler having a housing with front input opening, a rearwardly declining bottom ramp, and a scaling rotor journalled within the housing. A series of adjacently positioned flexible scaling arms are secured intermediate their ends to and extend radially from the rotor axle. The scaling arms are of rubber-nylon composition and have a pair of laterally spaced extension fingers at one end and a middle extension finger at the opposite end which carry transverse scaling teeth. The teeth arc through a continuous lateral width when the scaling rotor is rotated. The bottom ramp is pivotably mounted within the housing and is spring biased toward the scaling rotor for varying the distance between the ramp and the scaling rotor. The ramp has a hinged extension platform extending forwardly of the input opening.

5 Claims, 4 Drawing Figures

FISH SCALER

BACKGROUND OF THE INVENTION

1. Field of the Invention

This invention relates to a fish scaler and more particularly to a portable fish scaler suitable for domestic use.

2. Description of the Prior Art

Portable fish scalers for domestic use are well known in the prior art. The scaling rotors mounted within a housing in the past have been composed of spaced metal arms with their ends bent to form teeth which remove the scales when pulled across the fish. There has been a continuing failure in the art to provide a fish scaler which will accommodate fish of varying sizes yet maintain the teeth of the scaling rotor at a relatively constant pressure against the various sized fish to provide a uniform scaling operation and to provide a rotor of suitable construction to efficiently scale fish without tearing the skin of the fish.

SUMMARY OF THE INVENTION

My new and improved fish scaler provides a uniform scaling operation on various sized fish for efficient scaling without tearing the skin of the fish. The fish scaler has a housing with front input opening. A unique scaling rotor is journalled in the housing rearwardly of the front opening and has a series of adjacently positioned scaling arms. Each scaling arm has a pair of laterally spaced fingers at one end and a middle finger at the opposite end. The fingers have transverse teeth attached to their outer ends. The combined width of the teeth arc through a continuous lateral width at least as great as the width of the series of flexible scaling arms so that the scales across the entire width of the fish are uniformly removed.

The flexible scaling arms and the extension fingers are comprised of a resilient material such as nylon reinforced rubber. This composition gives the fingers and arms considerable flexibility. Additionally however, the width of each individual extension finger is substantially less than the arm of which is an integral part. This construction gives the individual fingers considerably more flexibility and "feel" or sensitivity than even the arms themselves and allows the scaling teeth of the fingers to be dragged along the fish farther than less flexible parts without damaging the skin of the fish. It gives the teeth a longer effective scaling stroke.

To further insure that various sized fish are scaled in a uniform and efficient manner, I have also provided a removable spring-biased bottom ramp pivotally secured within the housing for varying the distance between the ramp and the scaling rotor. When the bottom ramp is subjected to increased weight due to a large fish or to increased pressure exerted by the flexible scaling arms due to a thicker fish, the spring-biased bottom ramp will pivot away from the rotor. Therefore, the top side of the larger and/or thicker fish will tend to be supported by the ramp at the same distance from the scaling rotor as the smaller and/or thinner fish; the result being that the various sizes of fish tend to be subjected to the scaling teeth of the adjacent flexible scaling arms under more uniform pressure and hence are scaled in a more efficient manner than heretofore possible in a domestic power scaler.

The rotor axle has an extension shaft passing through a sidewall of the housing, the extension having a diameter not greater than ¼ inch. By inserting this extension shaft into the chuck of an ordinary electric hand drill, the rotor can be rapidly rotated providing an efficient, low cost, substantially carefree fish scaler for domestic use.

Further objects, features and advantages of my invention will become apparent from the following detailed description read in conjunction with the accompanying drawings wherein a preferred embodiment of my invention is illustrated for exemplification.

DESCRIPTION OF THE PREFERRED EMBODIMENT

Figure 1:
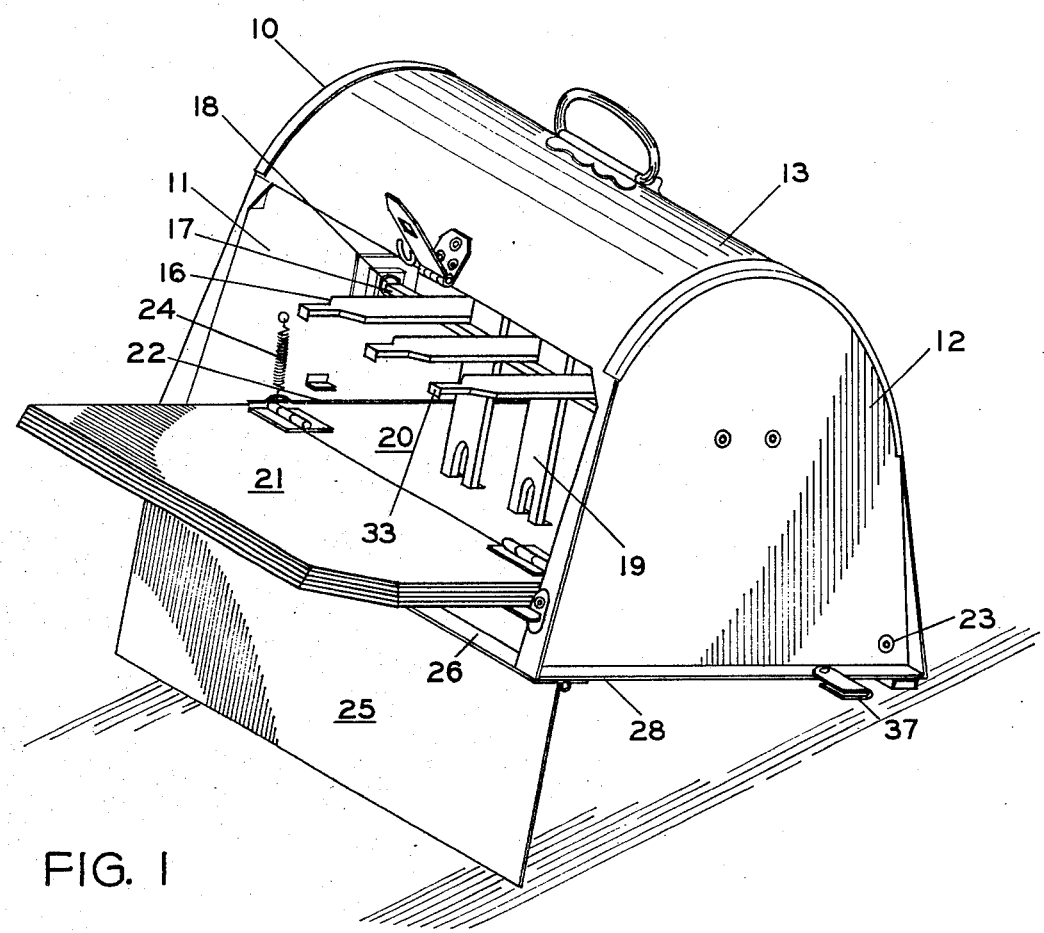
FIG. 1 is an overall perspective view of my fish scaler showing the hinged front extension platform of the fish ramp and the tilt plate in their operative positions.
Figure 2:
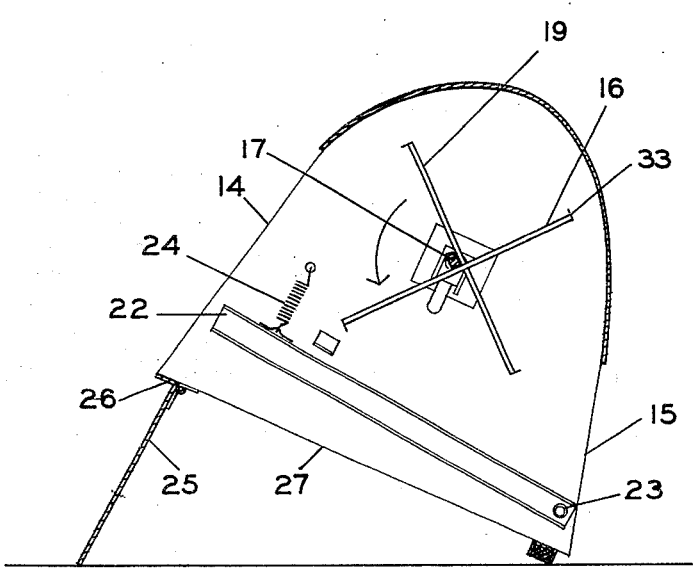
FIG. 2 is a section view taken along section line 1—1 in FIG. 1 with the fish ramp removed.

Referring more particularly to the drawings, wherein like numerals refer to like parts throughout the several views, FIG. 1 shows my fish scaler invention as it appears resting on any convenient flat surface. As best illustrated in FIGS. 1 and 2, the housing 10 of the fish scaler is comprised of sidewalls 11 and 12 connected together by a curved top portion 13 having front input opening 14 and rear opening 15. A scaling rotor 16 has its axle 17 rotatably journalled in the sides of the housing by any conventional means such as the nylon bearings 18 attached to the side walls. The rotor comprises a series of radially extending, adjacently positioned, flexible scaling arms 19 as will be further described below. A bottom or fish ramp 20 having a hinged front extension platform 21 is pivotally mounted in the housing beneath the rotor by any conventional means. In my preferred embodiment the fish ramp 20 is removably engaged in side channels 22 pivotally connected to the side walls of the housing 10 near the rear opening 15 by rivets 23. The fish ramp 20 is spring-biased toward the scaling rotor and into a rearwardly declining orientation by conventional means such as springs 24 attached to the side wall of the housing and to the side channel 22 near the front input opening 14. The bottom ramp 20 and its extension platform 21 can be removed from the fish scaler for cleaning after use by simply sliding the ramp forwardly out of the side channels 22.

A tilt plate 25 having a transverse flange 26 is hingedly connected to the bottom edges 27 and 28 of the side walls of the housing. The tilt plate is shown rotated to its forward operative position where the transverse flange 26 rests against the bottom edges of the side walls of the housing. The tilt plate supports and angularly displaces the housing 10 with respect to the horizontal providing an operator with convenient access to the input opening of the fish scaler and a steeper decline to the fish ramp.

Figure 3:
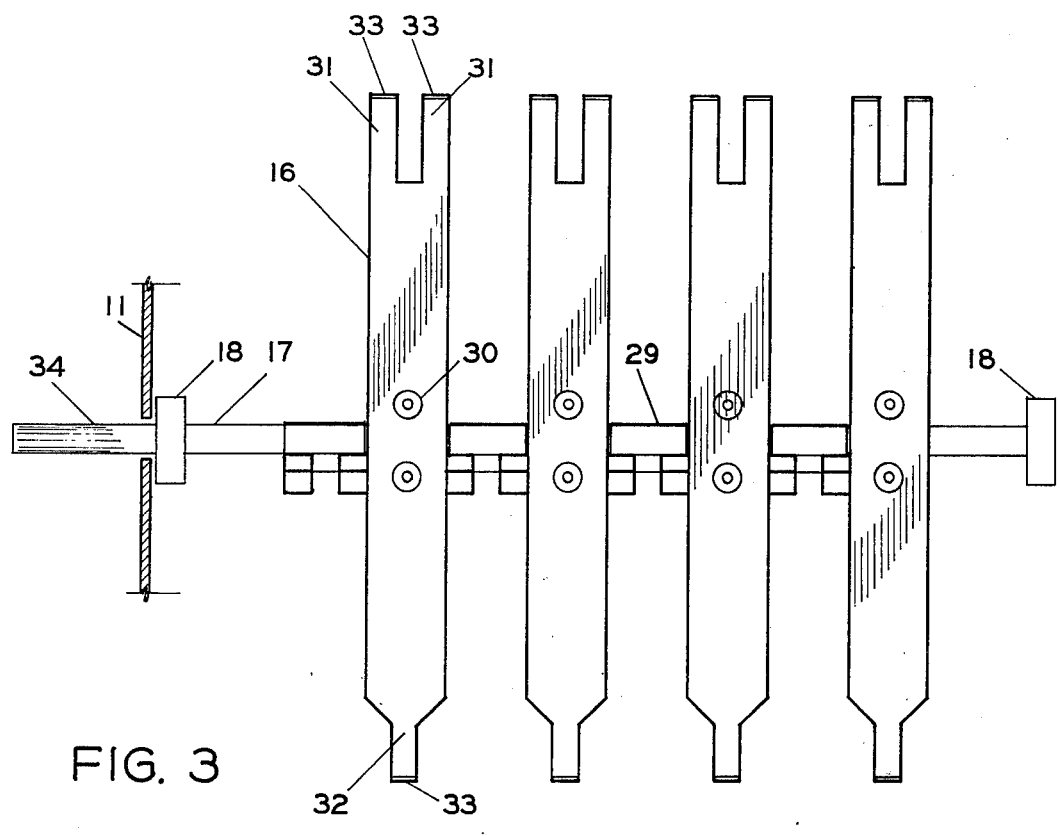
FIG. 3 shows the scaling rotor mounted nylon bearings.

FIG. 3 is an isolated view of the scaling rotor 16 having its axle 17 in nylon bearings 18. The scaling arms 19 are secured in adjacent abutting relation to one another on the rectangular axle 17 by conventional means such as the U-straps 29 and rivets 30 as shown.

Although the relative radial orientation of adjacent flexible scaling arms can be varied with respect to each other, in my preferred embodiment the immediately adjacent scaling arms are radially separated 90° so that the pulling force of the scaling teeth on the fish is distributed across the fish throughout the rotation of the arms.

Each of the flexible scaling arms have a pair of laterally spaced extension fingers 31 at one end and a middle extension finger 32 at the opposite end. Each finger has a substantially rigid transverse scaling tooth 33 preferably of metal attached to its outer edge oriented so that the tooth will be pointing downwardly toward the fish ramp in the direction of rotation when the rotor is rotated in the direction indicated in FIG. 2. When a fish is slid head first down the bottom ramp 20, this orientation of the scaling teeth facilitates the lifting up and removal of the fish scales as the teeth are dragged along the fish. The scaling teeth are of such a width that they arc through a substantially continuous lateral width at least as great as the width of the series flexible arms so that the scaling teeth pass across the entire width of the fish.

The axle of the scaling rotor has an extension shaft 34 which passes through the side wall 11 of the housing. The extension shaft has a diameter not greater than ¼ inch so that it can fit into the chuck of an ordinary hand drill. When a hand drill is attached to the extension shaft 34 and operated, the shaft and accompanying scaling rotor are rapidly rotated in a clockwise direction as viewed from that side providing an efficient scaling operation suitable for domestic use.

Figure 4:
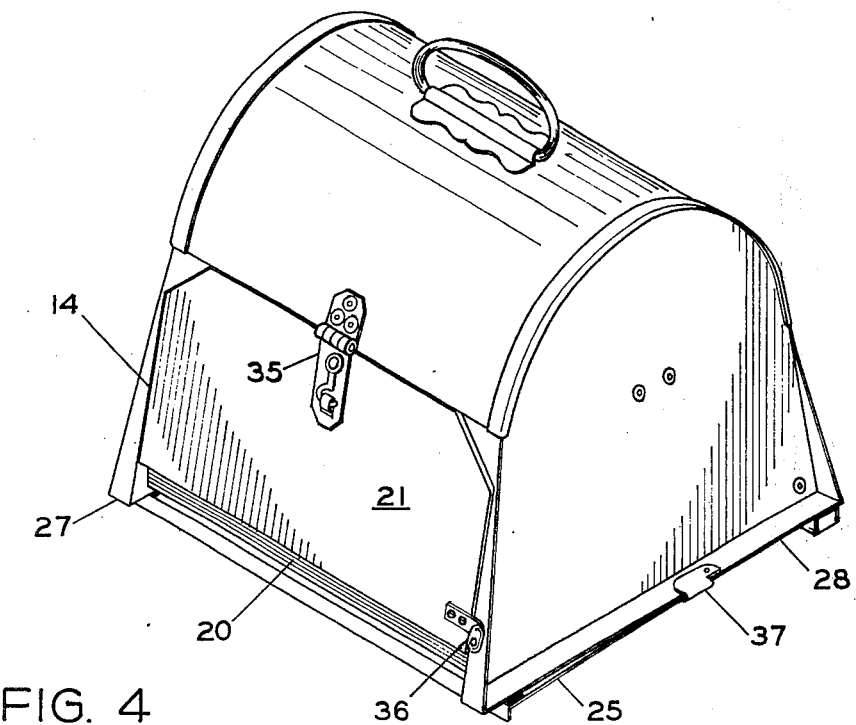
FIG. 4 is a perspective view of my fish scaler showing the front extension platform of the fish ramp and the tilt plate in closed positions for transportation and storage.

As illustrated in FIG. 4, after the fish scaler has been used it can be closed into a condition suitable for storage. The bottom ramp 20 is slid forwardly in the side channels so that the hinged front extension platform 21 can be folded into the front opening 14 of the housing where it is retained in place by conventional means such as by the hasp 35 and latch 36 as shown. The tilt plate 25 is pivoted upwardly against the bottom edges 27 and 28 of the housing and clasp 37 slid over the plate to hold it in this position for storage.

In using my scaler, the extension shaft of the rotor is secured in the chuck of an ordinary hand drill which can be set for automatic or manual operation by the operator. When the hand drill is operating, the scaling arms are rotated rapidly in a clockwise direction. The operator then places a fish head-first on the extension platform, preferably holding the fish by the tail with a clamping device (not shown) and then slides the fish to be scaled into the front opening and down the bottom ramp passing it underneath the rotating scaling arms until scaled to its tail. A large fish may extend out the rear opening. The fish is then drawn back out the front opening. The fish is turned over and the process is repeated to scale the other side of the fish.

Generally, the obtaining of an efficient and scaling operation on various sized fish is accomplished by maintaining the rotating scaling teeth at a substantially uniform pressure against the fish on the bottom ramp. The construction of the flexible scaling fingers and arms in combination with the spring-biased bottom ramp contribute to achieving the desired result. The pressure exerted by the scaling teeth on the fish is partially a function of the amount the flexible scaling finger and arms must bend as they pass over the surface of the fish. The spring-biased bottom platform helps maintain the scaling teeth at a more uniform pressure on various sized fish by keeping the distance between the upper surface of the various sized fish to be scaled and the scaling arms more constant. The spring-biased bottom ramp provides this constant distance, constant pressure regulation in two ways. First, the surface of the larger, thicker fish will ordinarily be closer to the flexible scaling arms than the surface of a smaller, thinner fish. Because of the greater weight of the larger fish, however, the spring-biased bottom platform is forced by gravity to pivot a greater distance away from the flexible scaling arms. Second, to the extent the adjacent flexible scaling arms do exert a greater pressure on the thicker fish as a result having to bend to a greater degree, the increased pressure is transmitted to the bottom platform causing it to further pivot away from the rotor. In addition, since the bottom ramp is pivotally mounted within the housing and spring-biased, if an operator wishes to scale an extremely small or extremely large fish he can simply raise or lower the bottom ramp manually to position the fish a desired distance below the rotating flexible scaling arms.

Furthermore, the high flexibility of the narrowed scaling fingers compared to the wider arms of which they are an integral part allows the scaling teeth to be dragged along the fish longer without substantially increased pressure.

It is to be understood that my invention is not confined to the particular construction and arrangement of parts herein illustrated and described, but embraces all such modified forms thereof as come within the scope of the following claims.

I claim:

1. A fish scaler comprising:
   a. a housing having front input opening,
   b. a scaling rotor having an axle rotatably journalled in said housing and having a series of adjacently positioned flexible scaling arms attached intermediate their ends to and extending radially from said axle,
   c. a pair of laterally spaced extension fingers at one end of each of said arms and a middle extension finger at the other end, said fingers being of less length than said arms, each of said fingers extending in the same general direction as the arm of which it is an integral part and being narrower in width than such arm to provide greater flexibility of said fingers than said arms,
   d. transverse scaling teeth attached to the outer ends of the laterally spaced and middle extension fingers of said arms at the same radial distance from said axle, the combined width of said teeth being substantially laterally co-extensive with said series of arms so as to arc through a substantially continuous lateral width upon rotation of said scaling rotor, and
   e. a bottom ramp mounted in said housing below said scaling rotor for receiving a fish to be scaled.

2. A fish scaler as specified in claim 1 comprising:
   a. a front extension platform hingedly connected to said bottom ramp for pivotable movement between an open working position extending forwardly beyond the front input opening of said housing and a storage position closing said input opening, and
   b. means on said housing for releasably securing said extension platform in said storage position.

3. A fish scaler as specified in claim 1 wherein the axle journalled in said housing has an exposed extension shaft passing through a side of said housing, said shaft extension having a diameter not greater than ¼ inch.

4. A fish scaler as specified in claim 1 wherein the flexible scaling arms and extension fingers are composed of nylon reinforced rubber and said teeth are metal.

5. A fish scaler as specified in claim 1 wherein said bottom ramp is movably mounted in said housing below said scaling rotor to allow varying of the distance between said ramp and said scaling rotor, and including spring means biasing said bottom ramp toward said scaling rotor.

* * * * *